US011142244B2

(12) United States Patent
von Tardy-Tuch

(10) Patent No.: US 11,142,244 B2
(45) Date of Patent: Oct. 12, 2021

(54) METHOD FOR OPERATING A STEER BY WIRE STEERING SYSTEM FOR A VEHICLE, AND STEER BY WIRE STEERING SYSTEM

(71) Applicant: Dr. Ing. h.c. F. Porsche Aktiengesellschaft, Stuttgart (DE)

(72) Inventor: Georg von Tardy-Tuch, Unterreichenbach-Kapfenhardt (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 191 days.

(21) Appl. No.: 16/694,027

(22) Filed: Nov. 25, 2019

(65) Prior Publication Data
US 2020/0231207 A1    Jul. 23, 2020

(30) Foreign Application Priority Data
Jan. 23, 2019  (DE) .......................... 102019101659.2

(51) Int. Cl.
*B62D 6/08*  (2006.01)
*B62D 6/00*  (2006.01)

(52) U.S. Cl.
CPC ............... *B62D 6/08* (2013.01); *B62D 6/002* (2013.01)

(58) Field of Classification Search
CPC .................................. B62D 6/08; B62D 6/002
See application file for complete search history.

(56) References Cited

U.S. PATENT DOCUMENTS

| 6,640,923 | B1 | 11/2003 | Dominke et al. |
| 9,174,664 | B2 | 11/2015 | Gaedke |
| 2020/0130728 | A1* | 4/2020 | Takashima ............. B62D 6/002 |

FOREIGN PATENT DOCUMENTS

| DE | 10032340 A1 | 1/2002 | |
| DE | 102007053818 A1 * | 5/2009 | ............. B62D 5/008 |

(Continued)

OTHER PUBLICATIONS

Audi Technology Portal, explanation of Dynamic steering. https://www.audi-technology-portal.de/en/chassis/wheel-suspension-steering/dynamic-steering (Year: 2011).*

(Continued)

*Primary Examiner* — Peter D Nolan
*Assistant Examiner* — Tanya C Sienko
(74) *Attorney, Agent, or Firm* — RatnerPrestia

(57) ABSTRACT

A method for operating a steer-by-wire steering system for a vehicle having at least one steerable wheel. The method including: providing a predefined steering ratio characteristic curve, recording a first steering input value of the steering input variable, providing a magnified characteristic curve that defines a bijective relationship between the steering input variable and the steering output variable, in a magnified region around the first steering input value, forming a modified steering ratio characteristic curve on the basis of the predefined steering ratio characteristic curve, recording a second steering input value of the steering input variable, and determining a steering output value in order to drive the steerable wheel on the basis of the second steering input value and the modified steering ratio characteristic curve. The predefined steering ratio characteristic curve, in the magnified region around the first steering input value, is replaced by the magnified characteristic curve.

11 Claims, 2 Drawing Sheets

(56) References Cited

FOREIGN PATENT DOCUMENTS

DE     102009014392 A1 * 10/2009  ............. B62D 6/002
DE     102011051488 A1    1/2013
DE     102015005124 A1 * 10/2016  ............. B62D 6/002

OTHER PUBLICATIONS

Takagi-Sugeno Fuzzy H Tracking Control for Steer-by-Wlre Systems Huang et al. 2015 IEEE Conference on Control Applications, Sep. 21-23, 2015, Sydney, Austratia (Year: 2015).*
Active Steering Control Strategy of Steer-by-Wire System Based on Variable Steering Ratio, F. Li, et al. ITEC Asia-Pacific 2014 (Year: 2014).*
Investigations on Cornering Control Algorithm Design and Road Feeling Optimization for a Steer-by-Wire Vehicle, H. Ha et al. Proceedings of the 2009 IEEE International Conference on Mechatronics and Automation. Aug. 9-12, Changchun, China (Year: 2008).*

\* cited by examiner

METHOD FOR OPERATING A STEER BY WIRE STEERING SYSTEM FOR A VEHICLE, AND STEER BY WIRE STEERING SYSTEM

CROSS-REFERENCE TO RELATED APPLICATION

This application claims priority to German Patent Application No. 10 2019 101 659.2, filed Jan. 23, 2019, the content of such application being incorporated by reference herein in its entirety.

FIELD OF THE INVENTION

The invention relates to a method for operating a steer-by-wire steering system for a vehicle having at least one steerable wheel.

BACKGROUND OF THE INVENTION

A steer-by-wire steering system is described for example in DE 10 2011 051 488 A1, which is incorporated by reference herein. Such a steer-by-wire steering system is understood in principle to mean a steering system in which a steering command from a control element of the vehicle, in particular a steering wheel or a control stick, is forwarded in exclusively electric form to an electromechanical actuator that executes the steering command. In such a system, there is no mechanical connection between the control element and the steered wheel or wheels.

In the case of some control elements, such as for example a control stick or a steering wheel that does not have a closed circle, there is generally only a small angular range available to displace the control element. As a result, precise steering is considerably more difficult for the driver than in the case of conventional steering wheels having a closed circle, which have a relatively large displacement range.

To improve steering precision, use may be made of superimposed steering systems, in which the profile of the steering ratio characteristic curve is set depending on the vehicle speed. In the case of a superimposed steering system, the steering ratio is changed globally, resulting in mapping of a steering input variable onto a steering output variable that is not identical for all vehicle states. This behavior makes it more difficult for the driver to adapt to the behavior of the steering system.

SUMMARY OF THE INVENTION

Against this background, it would be desirable to increase steering precision without losing bijectivity and global identity of the steering ratio.

Described herein is a method for operating a steer-by-wire steering system for a vehicle having at least one steerable wheel, which has the following method steps:
  providing a predefined steering ratio characteristic curve that defines a bijective relationship between a steering input variable of a control element of the vehicle and a steering output variable for displacing the steerable wheel,
  recording a first steering input value of the steering input variable,
  providing a magnified characteristic curve that defines a bijective relationship between the steering input variable and the steering output variable, in a magnified region around the first steering input value, such that a change of the steering input variable starting from the first steering input value, in accordance with the magnified characteristic curve, results in a smaller change of the associated steering output variable in comparison with the predefined steering ratio characteristic curve,
  forming a modified steering ratio characteristic curve on the basis of the predefined steering ratio characteristic curve, wherein the predefined steering ratio characteristic curve, in the magnified region around the first steering input value, is replaced by the magnified characteristic curve,
  recording a second steering input value of the steering input variable, and
  determining a steering output value in order to drive the steerable wheel on the basis of the second steering input value and the modified steering ratio characteristic curve.

In the method according to aspects of the invention, a steering input value of the control element is recorded and a steering output value for driving the steerable wheel is generated on the basis of the recorded steering input value and the modified steering ratio characteristic curve. The modified steering ratio characteristic curve is formed on the basis of a predefined steering ratio characteristic curve and a magnified characteristic curve. Both the steering ratio characteristic curve and the magnified characteristic curve are bijective with global identity, that is to say they define precisely one steering output value for any desired steering input value. In the magnified region around the first steering input value, the steering ratio characteristic curve is replaced by the magnified characteristic curve such that the formed modified steering ratio characteristic curve is also bijective and ensures global identity outside the magnified characteristic curve.

The magnified characteristic curve has a profile according to which a change of the steering input variable starting from the first steering input value results in a smaller change of the steering output variable in comparison with the predefined steering ratio characteristic curve. The steered wheel thus responds to the same change of the input variable with a smaller displacement in comparison with the non-modified predefined steering ratio characteristic curve. As a result, increased steering precision is made possible in the magnified region around the first steering input value. Thus, in the magnified region, that is to say locally around the instantaneous operating point, a magnification effect is able to be achieved for relatively small changes of the input variable. Larger changes of the input variable are by contrast not influenced by the magnification effect. By virtue of this method, steering precision is able to be increased and at the same time a steering ratio having global identity is able to be provided.

According to one advantageous configuration of the method, the magnified characteristic curve transitions into the predefined steering ratio characteristic curve at the edges of the magnified region. As a result, the operating point of the steering device, in the case of changes of the steering input variable that change this beyond the edge of the magnified region, is able to return to the unmodified, predefined steering ratio characteristic curve. The magnification effect is thus cancelled out for larger changes of the steering input value.

A configuration in which the modified steering ratio characteristic curve is formed again when the second steering input value lies outside the magnified region, wherein the predefined steering ratio characteristic curve, in a further magnified region around the second steering input value, is replaced by the magnified characteristic curve, has proven to be advantageous. By virtue of forming the modified steering ratio characteristic curve again in this way, it is possible to achieve a situation whereby the region with increased precision moves along with the instantaneous operating point of the steering system. In this respect, a magnification effect may take place not only in the region around an operating point of the control element that corresponds to a central position, but rather at any desired position of the control element.

According to one advantageous configuration, there is provision for the magnified region to be less than or equal to 30% of a maximum input value range, preferably less than or equal to 20% of the maximum input value range, particularly preferably less than or equal to 10% of the maximum input value range, in particular less than or equal to 5% of the maximum input value range. The maximum input value range may be defined by a maximum displacement of the control element in a first direction and a second direction opposing the first direction.

The steering input variable is preferably an input angle, in particular a setting angle of the control element, and the steering output variable is preferably an output angle, in particular a steering angle of the steerable wheel. In the case of such a configuration, an angle specification by a driver on the control element of the vehicle may result in an angular position of the steerable wheel. In this respect, the method provides a steering angle magnifier that, in the case of small changes of the input angle, provides smaller changes of the output angle than defined by the predefined steering ratio characteristic curve.

One alternative preferred configuration makes provision for the steering input variable to be an input moment, in particular a torque applied to the control element, and for the steering output variable to be an output moment, in particular a torque acting on the steerable wheel. Such a configuration makes it possible for the specification of a torque on the control element to result in a torque on the wheel that displaces the wheel.

According to one advantageous configuration, the predefined steering ratio characteristic curve has a progressive profile. This means that the steering output value, in the case of the steering input value moving increasingly away from a zero value or a central position of the control element, increases overproportionately.

Preferably, a yaw acceleration of the vehicle is measured and the magnified characteristic curve is provided depending on the measured yaw acceleration. By virtue of such a configuration, it is possible to achieve a situation whereby the magnification effect in the case of entering or exiting a curve, that is to say a higher yaw acceleration of the vehicle, is set differently than in the case of stationary cornering or traveling in a straight line, that is to say in the case of low yaw acceleration. By way of example, in the case of a low yaw acceleration, a stronger magnification effect may be set than in the case of a higher yaw acceleration, such that the magnified characteristic curve deviates more greatly from the unmodified, predefined steering ratio characteristic curve in the case of the low yaw acceleration than in the case of the higher yaw acceleration. The magnified characteristic curve may in particular have a lower gradient in the case of a low yaw acceleration than in the case of a higher yaw acceleration.

According to one advantageous configuration, there is provision for the method to additionally have the following method steps:

providing a predefined inverse steering ratio characteristic curve that defines a bijective relationship between a feedback input variable of a steerable wheel of the vehicle and a feedback output variable for displacing the control element of the vehicle, recording a first feedback input value of the feedback input variable, providing an inverse magnified characteristic curve that defines a bijective relationship between the feedback input variable and the feedback output variable, in a magnified region around the first feedback input value, such that a change of the feedback input variable starting from the first feedback input value, in accordance with the inverse magnified characteristic curve, results in a larger change of the associated feedback output variable in comparison with the predefined inverse steering ratio characteristic curve, forming a modified inverse steering ratio characteristic curve on the basis of the predefined inverse steering ratio characteristic curve, wherein the predefined inverse steering ratio characteristic curve, in the magnified region around the first feedback input value, is replaced by the inverse magnified characteristic curve, recording a second feedback input value of the feedback input variable, and determining a feedback output value in order to drive the control element on the basis of the second feedback input value and the modified inverse steering ratio characteristic curve.

It becomes possible, by virtue of the optional method steps cited above, to give the driver of the vehicle feedback about the actual implementation of the steering command on the steerable wheel by way of the control element. In this case, a feedback input variable of the steerable wheel is recorded and a feedback output variable for driving the control element is generated on the basis thereof and of the modified inverse steering ratio characteristic curve. The modified inverse steering ratio characteristic curve is formed on the basis of a predefined inverse steering ratio characteristic curve and an inverse magnified characteristic curve. The inverse magnified characteristic curve has a profile according to which a change of the feedback input variable starting from the first feedback input value, in accordance with the inverse magnified characteristic curve, results in a larger change of the associated feedback output variable in comparison with the predefined inverse steering ratio characteristic curve. The control element thus responds to the same change of the input variable with a larger displacement in comparison with the non-modified predefined inverse steering ratio characteristic curve. As a result, more pronounced feedback is generated on the control element in the magnified region around the first feedback input value.

A further subject of the invention is a steer-by-wire steering system for a vehicle having at least one steerable wheel, having a control device that is configured so as to execute the following method steps:

providing a predefined steering ratio characteristic curve that defines a bijective relationship between a steering input variable of a control element of the vehicle and a steering output variable for displacing the steerable wheel, recording a first steering input value of the steering input variable, providing a magnified characteristic curve that defines a bijective relationship between the steering input variable and the steering output variable, in a magnified region around the first steering input value, such that a change of the steering input variable starting from the first steering input value, in accordance with the magnified characteristic curve, results in a smaller change of the associated steering output variable in comparison with the predefined steering ratio characteristic curve, forming a modified steering ratio characteristic curve on the basis of the predefined steering ratio characteristic curve, wherein the predefined steering ratio characteristic curve, in the magnified region around the first steering input value, is replaced by the magnified characteristic curve, recording a second steering input value of the steering input variable, and determining a steering output value in order to drive the steerable wheel on the basis of the second steering input value and the modified steering ratio characteristic curve.

Furthermore described is a vehicle having an abovementioned steer-by-wire steering device. The vehicle may have one or more, preferably two, steerable wheels that are able to be steered by way of the steer-by-wire steering device.

Using the steer-by-wire steering system and the vehicle, it is possible to achieve the same advantages as have already been explained in connection with the method according to aspects of the invention.

The advantageous configurations and features described in connection with the method may be applied on their own or also in combination in the case of the steer-by-wire steering system or the vehicle.

BRIEF DESCRIPTION OF THE DRAWINGS

Further advantages and details of the invention are intended to be explained below with reference to exemplary embodiments of the method and the steer-by-wire steering system, which are explained with the aid of the figures. In the figures.

DETAILED DESCRIPTION OF THE INVENTION

Figure 1:
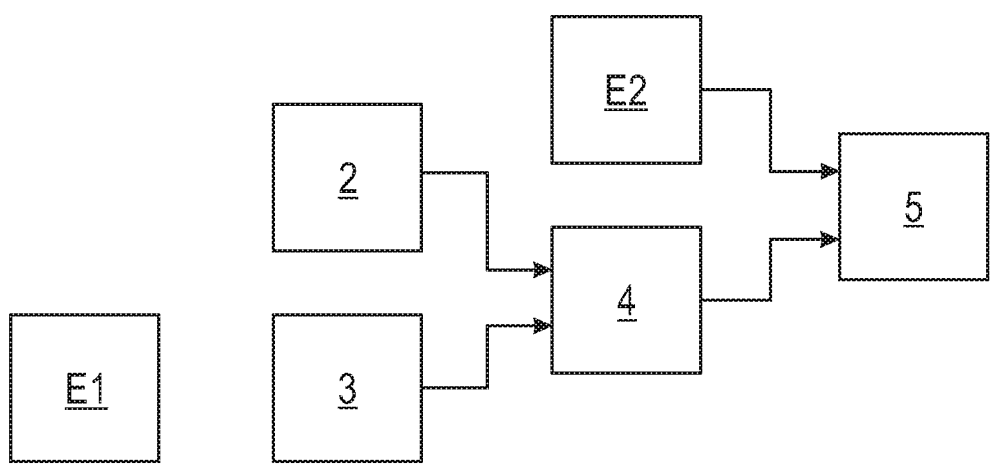
FIG. 1 shows a flowchart in order to illustrate a first exemplary embodiment of the method according to aspects of the invention.
Figure 2:
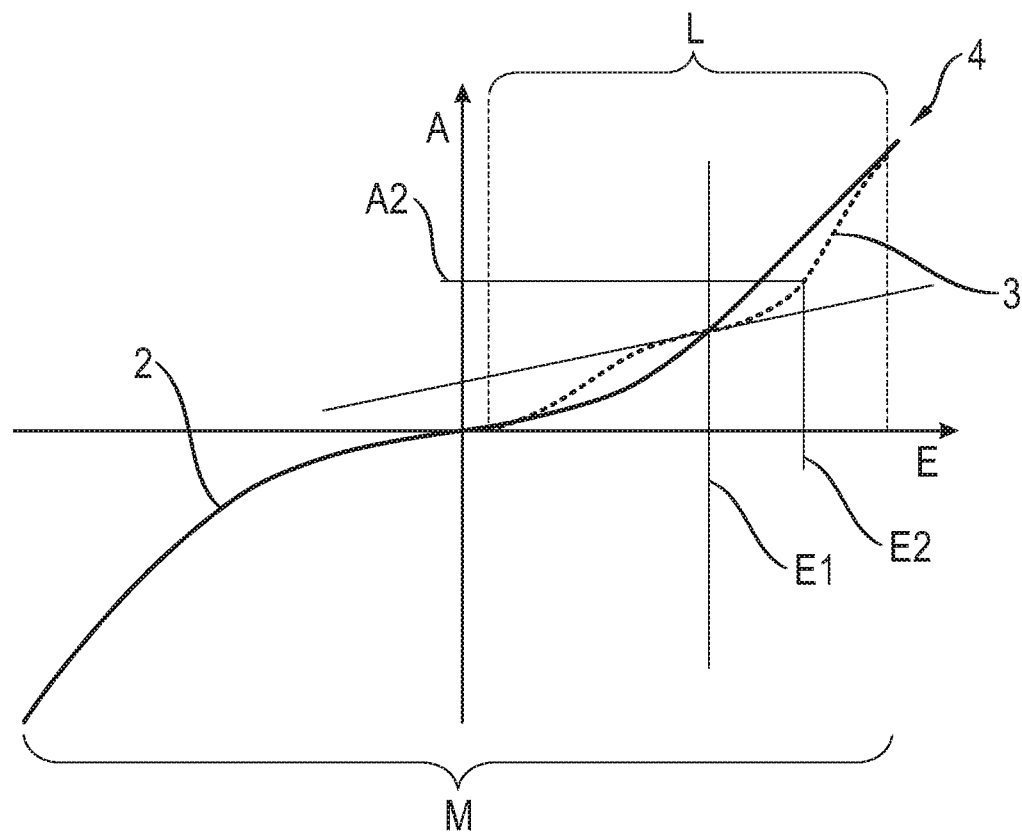
FIG. 2 shows a first modified steering ratio characteristic curve.

FIG. 1 shows a schematic flowchart using which, considered together with FIG. 2, the intention is to explain one exemplary embodiment according to aspects of the invention of a method for operating a steer-by-wire steering system for a vehicle having at least one steerable wheel. The vehicle is for example a passenger vehicle having a plurality of wheels that are distributed over at least two axles. At least one of the two axles, for example a front axle, is steerable, that is to say it has two wheels whose steering angle is able to be set in order to initiate cornering of the vehicle.

The method comprises the following method steps. A predefined steering ratio characteristic curve 2 is provided that defines precisely one steering output value of the steering output variable A for each steering input value of the steering input variable E of the permissible input value range. This predefined steering ratio characteristic curve 2 has a progressive profile. The steering input variable E is a state variable of a control element of the vehicle. The control element may be designed for example as a steering wheel or as a control stick. The steering input variable E may be an input angle, in particular a setting angle of the control element. As an alternative, the steering input variable E may be an input moment, for example a torque applied to the control element. The steering input variable E is preferably recorded by way of a sensor arranged on the control element, for example a magnetic or optical angle sensor or a piezoelectric, magnetoresistive or optical torque sensor. A first steering input value E1 is then recorded in a recording step.

In order to increase the steering precision in a region around the instantaneous operating point of the steering device without losing the global bijectivity and identity of the steering ratio, a magnification effect is implemented by way of the method. For this purpose, a magnified characteristic curve 3 is provided that defines a bijective relationship between the steering input variable E and the steering output variable A, in a magnified region L around the first steering input value 1, such that a change of the steering input variable E starting from the first steering input value E1, in accordance with the magnified characteristic curve 3, results in a smaller change of the associated steering output variable A in comparison with the predefined steering ratio characteristic curve 2.

A modified steering ratio characteristic curve 4 is then formed on the basis of the predefined steering ratio characteristic curve 2 and the magnified characteristic curve 3. In this case, the predefined steering ratio characteristic curve 2, in the magnified region L around the first steering input value E1, is replaced by the magnified characteristic curve 3. The magnified characteristic curve 3 transitions into the predefined steering ratio characteristic curve 4 at the edges of the magnified region L.

The modified steering ratio characteristic curve 4 is then used to operate the steer-by-wire steering system. A second steering input value E2 of the steering input variable E is thus recorded, and a steering output value A2 for driving the steerable wheel is determined on the basis of the second steering input value E1 and the modified steering ratio characteristic curve 4.

If the second steering input value E2 lies outside the magnified region L, the modified steering ratio characteristic curve 4 is formed again, wherein the predefined steering ratio characteristic curve 2, in a further magnified region around the second steering input value E2, is replaced by the magnified characteristic curve 3. In this respect, the magnified region L moves along with the operating point of the steering device. The size of the magnified region L is preferably selected such that it is less than or equal to 30% of a maximum input value range M, preferably less than or equal to 20% of the maximum input value range M, particularly preferably less than or equal to 10% of the maximum input value range M, in particular less than or equal to 5% of the maximum input value range.

Figure 3:
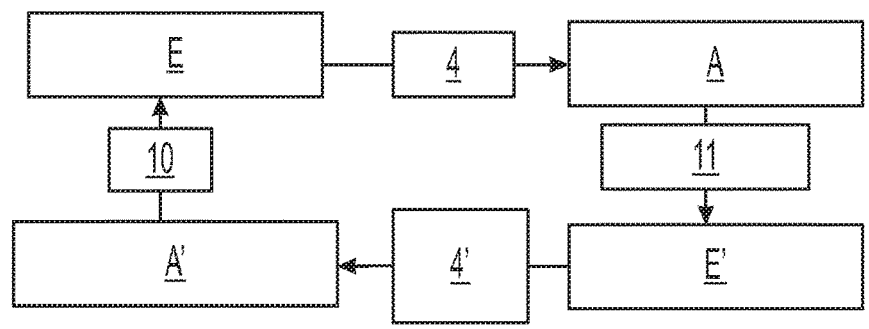
FIG. 3 shows a flowchart in order to illustrate a second exemplary embodiment of the method according to aspects of the invention.

FIG. 3 shows a flowchart in order to illustrate a second exemplary embodiment of the method according to aspects of the invention. This exemplary embodiment implements feedback by way of the control element of the vehicle, such that the driver receives feedback about the actual implementation of his steering command.

The driver specifies a steering input value of the steering input variable E by way of the control element 10. As explained above with reference to FIG. 1 and FIG. 2, a modified steering ratio characteristic curve 4 is formed and a steering output value of the steering output variable A is determined on the basis thereof. In the exemplary embodiment according to FIG. 3, the steering input variable E is an input angle, in particular a setting angle of the control element, and the steering output variable A is an output angle, in particular a steering angle of the steerable wheel 11.

The feedback to the driver is provided by way of a torque that is generated on the control element, for example by way of an actuator. For this purpose, the following method steps are executed:

providing a predefined inverse steering ratio characteristic curve that defines a bijective relationship between a feedback input variable E' of a steerable wheel of the vehicle and a feedback output variable A' for displacing the control element of the vehicle, recording a first feedback input value of the feedback input variable E', providing an inverse magnified characteristic curve 3' that defines a bijective relationship between the feedback input variable E' and the feedback output variable A', in a magnified region L around the first feedback input value, such that a change of the feedback input variable E' starting from the first feedback input value, in accordance with the inverse magnified characteristic curve 3', results in a larger change of the associated feedback output variable A' in comparison with the predefined inverse steering ratio characteristic curve 2', forming a modified inverse steering ratio characteristic curve 4' on the basis of the predefined inverse steering ratio characteristic curve 2', wherein the predefined inverse steering ratio characteristic curve 2', in the magnified region L around the first feedback input value, is replaced by the inverse magnified characteristic curve 3', recording a second feedback input value of the feedback input variable E', and determining a feedback output value in order to drive the control element on the basis of the second feedback input value and the modified inverse steering ratio characteristic curve 4'.

In this exemplary embodiment, the feedback input variable E' is thus an input moment, namely the wheel steering moment acting on the steerable wheel in order to displace the wheel. The feedback output variable A' is an output moment, namely a torque acting on the control element. In this respect, the modified steering ratio characteristic curve 4 provides a magnification function for an angle and the modified inverse steering ratio characteristic curve 4' provides a magnification function for a torque.

In a third exemplary embodiment, which likewise corresponds to the illustration in FIG. 3, the modified steering ratio characteristic curve 4 is a magnification function for a torque and the modified inverse steering ratio characteristic curve 4' provides a magnification function for an angle. According to this variant, the steering input variable E is an input moment and the steering output variable A is an output moment. The feedback input variable E' is furthermore an input angle, namely the steering angle of the wheel 11. The feedback output variable A' is in this case an output angle, namely an angular position of the control element 10.

Figure 4:
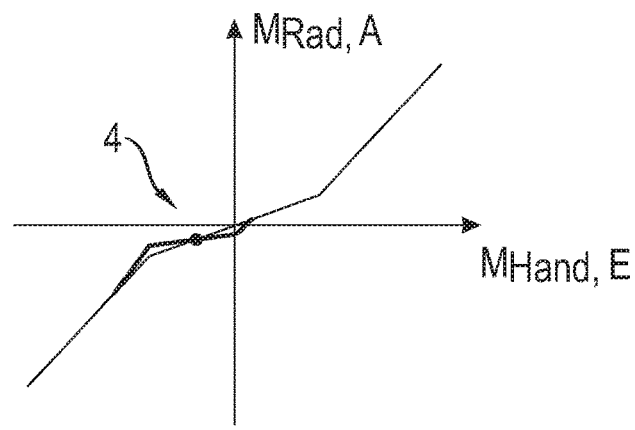
FIG. 4 shows a second modified steering ratio characteristic curve.

One exemplary illustration of a modified steering ratio characteristic curve 4 according to the third exemplary embodiment is shown in FIG. 4. $M_{Hand}$ in this case denotes the steering input variable E, configured as steering moment, and $M_{Rad}$ denotes the steering output variable A, configured as output moment.

Figure 5:
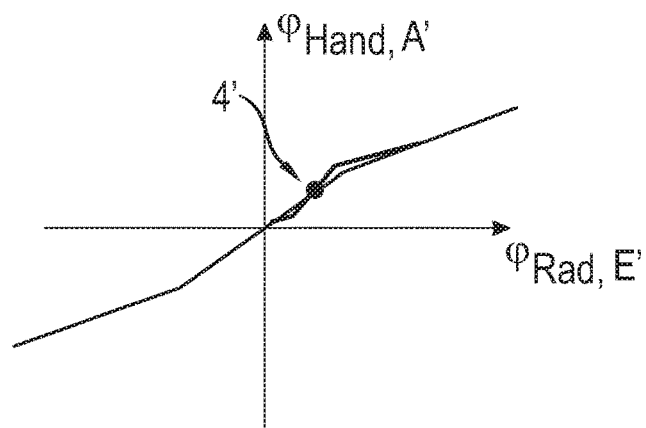
FIG. 5 shows an inverse modified steering ratio characteristic curve.

FIG. 5 shows one exemplary illustration of a modified inverse steering ratio characteristic curve 4' according to the third exemplary embodiment. $\varphi_{Rad}$ in this case denotes the feedback input variable E', configured as steering angle, and $\varphi_{Hand}$ denotes the feedback output variable A', configured as output angle.

The methods described above for operating a steer-by-wire steering system for a vehicle having at least one steerable wheel comprise the following method steps:

providing a predefined steering ratio characteristic curve 2 that defines a bijective relationship with global identity between a steering input variable E of a control element of the vehicle and a steering output variable A for displacing the steerable wheel, recording a first steering input value E1 of the steering input variable E, providing a magnified characteristic curve 3 that defines a bijective relationship between the steering input variable E and the steering output variable A, in a magnified region L around the first steering input value E1, such that a change of the steering input variable E starting from the first steering input value E1, in accordance with the magnified characteristic curve 3, results in a smaller change of the associated steering output variable A in comparison with the predefined steering ratio characteristic curve 2, forming a modified steering ratio characteristic curve 4 on the basis of the predefined steering ratio characteristic curve 2, wherein the predefined steering ratio characteristic curve 2, in the magnified region L around the first steering input value E1, is replaced by the magnified characteristic curve 3, recording a second steering input value E2 of the steering input variable E, and determining a steering output value A2 in order to drive the steerable wheel on the basis of the second steering input value E1 and the modified steering ratio characteristic curve 4.

LIST OF REFERENCE SIGNS

2 Predefined steering ratio characteristic curve
2' Predefined inverse steering ratio characteristic curve
3 Magnified characteristic curve
3' Inverse magnified characteristic curve
4 Modified steering ratio characteristic curve
4' Modified inverse steering ratio characteristic curve
A Steering output variable
A2 Steering output value
A' Feedback output variable
E Steering input variable
E1, E2 Steering input value
E' Feedback input variable
10 Control element
11 Steerable wheel
$M_{Hand}$ Steering moment
$M_{Rad}$ Output moment
$\varphi_{Hand}$ Output angle
$\varphi_{Rad}$ Steering angle It is noted that any reference signs in the claims should be construed as non-limiting.

What is claimed is:

1. A method for operating a steer-by-wire steering system for a vehicle having at least one steerable wheel, said method comprising:

providing a predefined steering ratio characteristic curve (2) that defines a bijective relationship between a steering input variable (E) of a control element of the vehicle and a steering output variable (A) for displacing the steerable wheel, recording a first steering input value (E1) of the steering input variable (E), providing a magnified characteristic curve (3) that defines a bijective relationship between the steering input variable (E) and the steering output variable (A), in a magnified region (L) around the first steering input value (E1), such that a change of the steering input variable (E) starting from the first steering input value (E1), in accordance with the magnified characteristic curve (3), results in a local change of the associated steering output variable (A) in comparison with the predefined steering ratio characteristic curve (2), forming a modified steering ratio characteristic curve (4) on the basis of the predefined steering ratio characteristic curve (2), wherein the predefined steering ratio characteristic curve (2), in the magnified region (L) around the first steering input value (E1), is replaced by the magnified characteristic curve (3), recording a second steering input value (E2) of the steering input variable (E), and determining a steering output value (A2) in order to drive the steerable wheel on the basis of the second steering input value (E1) and the modified steering ratio characteristic curve (4).

2. The method as claimed in claim 1, wherein the magnified characteristic curve (3) transitions into the predefined steering ratio characteristic curve (4) at edges of the magnified region (L).

3. The method as claimed in claim 1, wherein the modified steering ratio characteristic curve (4) is formed again when the second steering input value (E2) lies outside the magnified region (L), wherein the predefined steering ratio characteristic curve (2), in a further magnified region around the second steering input value (E2), is replaced by the magnified characteristic curve (3).

4. The method as claimed in claim 1, wherein the magnified region (L) is less than or equal to 30% of a maximum input value range (M).

5. The method as claimed in claim 1, wherein the steering input variable (E) is a setting input angle of the control element, and the steering output variable (A) is a steering output angle of the steerable wheel.

6. The method as claimed in claim 1, wherein the steering input variable (E) is an input moment torque applied to the control element, and the steering output variable (A) is an output moment torque acting on the steerable wheel.

7. The method as claimed in claim 1, wherein the predefined steering ratio characteristic curve (2) has a progressive profile.

8. The method as claimed in claim 1, wherein the magnified characteristic curve (3) has a progressive profile in the magnified region (L).

9. The method as claimed in claim 1, wherein a yaw acceleration of the vehicle is measured and the magnified characteristic curve (3) is provided depending on the measured yaw acceleration.

10. The method as claimed in claim 1, further comprising:
providing a predefined inverse steering ratio characteristic curve that defines a bijective relationship with global identity between a feedback input variable (E') of a steerable wheel of the vehicle and a feedback output variable (A') for displacing the control element of the vehicle, recording a first feedback input value of the feedback input variable (E'), providing an inverse magnified characteristic curve (3') that defines a bijective relationship with global identity between the feedback input variable (E') and the feedback output variable (A'), in a magnified region (L) around the first feedback input value, such that a change of the feedback input variable (E') starting from the first feedback input value, in accordance with the inverse magnified characteristic curve (3'), results in a larger change of the associated feedback output variable (A') in comparison with the predefined inverse steering ratio characteristic curve (2'), forming a modified inverse steering ratio characteristic curve (4') on the basis of the predefined inverse steering ratio characteristic curve (2'), wherein the predefined inverse steering ratio characteristic curve (2'), in the magnified region (L) around the first feedback input value, is replaced by the inverse magnified characteristic curve (3'), recording a second feedback input value of the feedback input variable (E'), and determining a feedback output value in order to drive the control element on the basis of the second feedback input value and the modified inverse steering ratio characteristic curve (4').

11. A steer-by-wire steering system for a vehicle having at least one steerable wheel, said system comprising a control device that is configured to execute the following steps:

providing a predefined steering ratio characteristic curve (2) that defines a bijective relationship between a steering input variable (E) of a control element of the vehicle and a steering output variable (A) for displacing the steerable wheel, recording a first steering input value (E1) of the steering input variable (E), providing a magnified characteristic curve (3) that defines a bijective relationship between the steering input variable (E) and the steering output variable (A), in a magnified region (L) around the first steering input value (E1), such that a change of the steering input variable (E) starting from the first steering input value (E1), in accordance with the magnified characteristic curve (3), results in a smaller change of the associated steering output variable (A) in comparison with the predefined steering ratio characteristic curve (2), forming a modified steering ratio characteristic curve (4) on the basis of the predefined steering ratio characteristic curve (2), wherein the predefined steering ratio characteristic curve (2), in the magnified region (L) around the first steering input value (E1), is replaced by the magnified characteristic curve (3), recording a second steering input value (E2) of the steering input variable (E), and determining a steering output value (A2) in order to drive the steerable wheel on the basis of the second steering input value (E1) and the modified steering ratio characteristic curve (4).

* * * * *